US011714722B2

(12) United States Patent
Yu et al.

(10) Patent No.: US 11,714,722 B2
(45) Date of Patent: Aug. 1, 2023

(54) POWER LOSS RECOVERY FOR MEMORY DEVICES

(71) Applicant: Micron Technology, Inc., Boise, ID (US)

(72) Inventors: Yipei Yu, San Francisco, CA (US); Wei Wang, Dublin, CA (US); Jiangli Zhu, San Jose, CA (US); Huapeng Guan, Redwood City, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/486,260

(22) Filed: Sep. 27, 2021

(65) Prior Publication Data

US 2022/0100608 A1  Mar. 31, 2022

Related U.S. Application Data

(60) Provisional application No. 63/085,655, filed on Sep. 30, 2020.

(51) Int. Cl.
*G06F 11/14* (2006.01)

(52) U.S. Cl.
CPC ...... *G06F 11/1446* (2013.01); *G06F 11/1471* (2013.01); *G06F 2201/84* (2013.01)

(58) Field of Classification Search
CPC ............. G06F 11/1446; G06F 11/1471; G06F 2201/84
USPC ..................................................... 714/15, 19
See application file for complete search history.

(56) References Cited

U.S. PATENT DOCUMENTS

| 2017/0139781 | A1* | 5/2017 | Camp | G06F 11/1435 |
| 2018/0004651 | A1* | 1/2018 | Battaje | G06F 11/1469 |
| 2019/0087284 | A1* | 3/2019 | Kim | G06F 12/0246 |
| 2021/0081284 | A1* | 3/2021 | Watt | G06F 11/076 |

(Continued)

*Primary Examiner* — Chae M Ko
(74) *Attorney, Agent, or Firm* — Lowenstein Sandler LLP

(57) ABSTRACT

An example memory sub-system includes one or more memory devices and a processing device, operatively coupled to the one or more memory devices. The processing device is configured to store, on a non-volatile memory device of the one or more memory devices, a snapshot of a logical-to-physical (L2P) table comprising a plurality of L2P table entries, each L2P table entry mapping a logical address defined in a logical address space to a physical address identifying a management unit on a memory device of the one or more memory devices; store, on the non-volatile memory device of the one or more memory devices, a physical-to-logical (P2L) table comprising a plurality of P2L table entries, each L2P table entry mapping a physical address identifying a management unit on a memory device of the one or more memory devices to metadata associated with the management unit; store, on the non-volatile memory device, a list of unallocated MUs; store, on the non-volatile memory device, an L2P update journal including one or more L2P journal entries, wherein each L2P journal entry reflects an update to an L2P table entry of the plurality of L2P table entries, wherein the update has been performed after storing the snapshot of the L2P table; and responsive to detecting a power up event following a power loss event, reconstruct the L2P table using the snapshot of the L2P table, the L2P update journal, the P2L table, and the list of unallocated management units.

20 Claims, 9 Drawing Sheets

(56) References Cited

U.S. PATENT DOCUMENTS

2021/0200670 A1\* 7/2021 Winterfeld .......... G06F 11/3058
2021/0232466 A1\* 7/2021 Matsushita ........... G06F 16/128
2021/0365208 A1\* 11/2021 Li ........................ G06F 3/0659

\* cited by examiner

| Logical Block | Physical Block | Spare MU list 206 | Blackout queue 410 |
|---|---|---|---|
| L2P[L2] = a<br>P2L[a] = L2 |  |  |  |
| L2P[L3] = b<br>P2L[b] = L3 |  | | |
| L2P[L1] = x<br>P2L[x] = L1 |  | | |

POWER LOSS RECOVERY FOR MEMORY DEVICES

REFERENCE TO RELATED APPLICATION

This application claims the benefit of U.S. Provisional Patent Application No. 63/085,655, filed Sep. 30, 2020, the entirety of which is incorporated herein by reference.

TECHNICAL FIELD

Embodiments of the disclosure are generally related to memory sub-systems, and more specifically, are related to power loss recovery for memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

DETAILED DESCRIPTION

Figure 1:
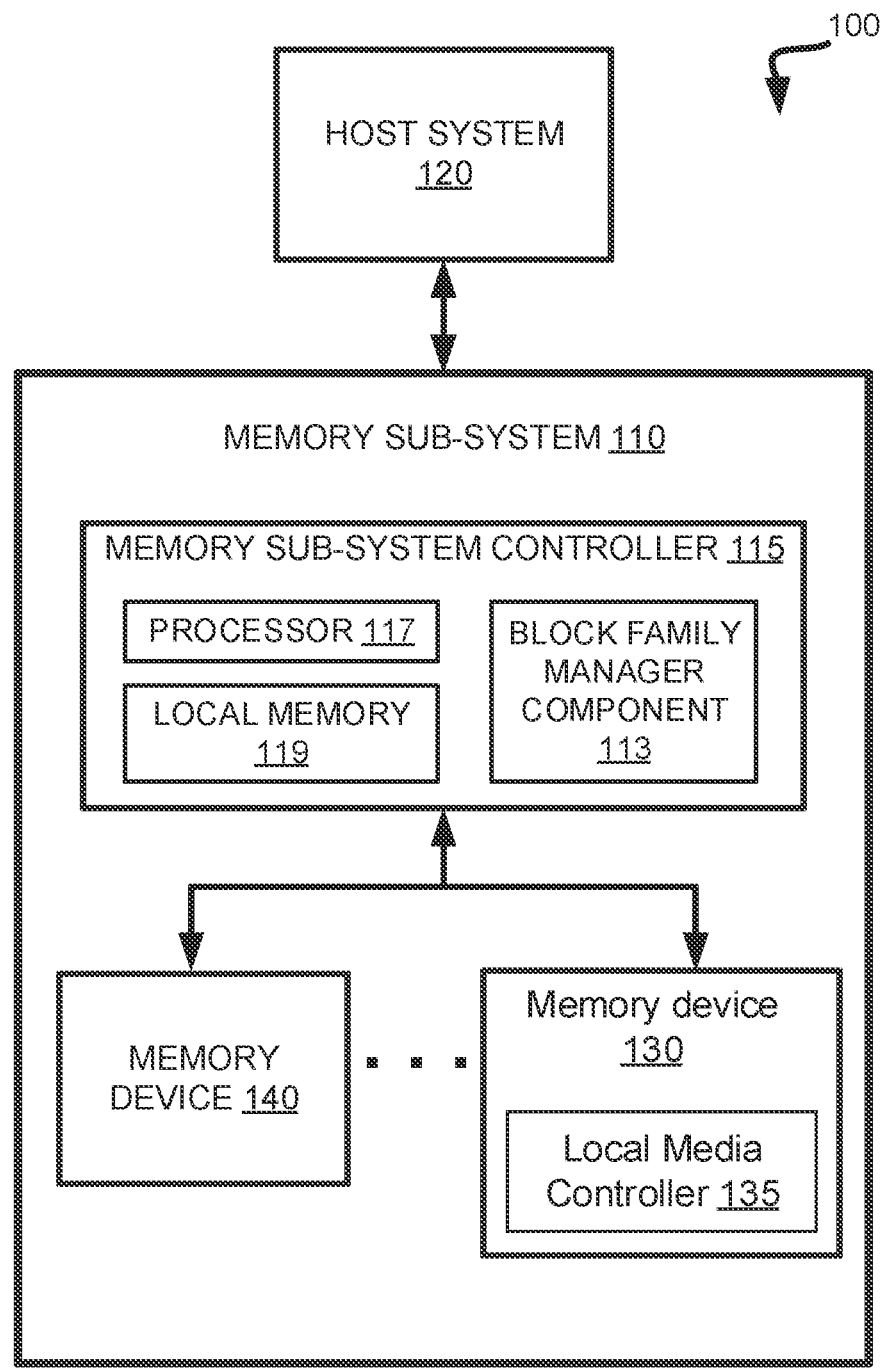
FIG. 1 illustrates an example computing system that includes a memory sub-system in accordance with some embodiments of the present disclosure.

Embodiments of the present disclosure are directed to power loss recovery for memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices that retain the data stored thereon when no power is supplied to the memory device. One example of non-volatile memory devices is a negative-and (NAND) memory device. Another example is a three-dimensional cross-point ("3D cross-point") memory device, which is a cross-point array of non-volatile memory cells. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include a logical address (e.g., a logical block address (LBA) and namespace) for the host data, which is the location that the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (specifying which LBAs contain valid data), etc.

In order to isolate, from the host system, various aspects of physical implementations of memory devices employed by memory sub-systems, the memory sub-system can maintain a data structure that maps each logical address to a corresponding physical address (PA). In some implementations, the physical address can include channel identifier, die identifier, page identifier, plane identifier and/or frame identifier. The mapping data structure is referred to herein as a logical-to-physical (L2P) table.

With some types of memory (e.g., NAND), pages can be grouped to form blocks. Some types of memory, such as 3D cross-point, can group pages across dice and channels to form management units. Accordingly, each entry of the L2P table can reference a management unit (MU), which includes one or more pages (e.g., a set of pages crossing channel, die, and/or partition) that are grouped together for management purposes. The term "management unit" is utilized in the present disclosure to refer to both "management unit" and "super management unit" (which is a set of management units that are grouped together for management purposes), unless specifically noted otherwise.

Each L2P table entry can map a logical MU address to a physical MU address. The L2P table maintained by the firmware of the memory sub-system controller and is stored on one or more non-volatile memory devices of the memory sub-system. In order to improve the overall efficiency of the data transfer between a host system and a memory sub-system, the L2P table can at least partially be cached by one or more volatile memory devices of the memory sub-system. The memory sub-system controller may implement appropriate cache management policies in order to manage eviction of cache entries.

An unexpected power loss event may occur before the L2P metadata has been fully stored to a non-volatile memory device, thus possibly leaving the L2P metadata in a state which is inconsistent with the state of memory devices. Accordingly, effective power loss recovery strategies should be able to reconstruct the L2P metadata to a consistent state that is synchronized with the state of the data stored by the memory sub-system.

In some implementations, a memory sub-system may be equipped with a capacitor which is charging when external power is supplied to the memory sub-system and is utilized as a back-up power source for performing the necessary metadata storing operations when the external power supply is lost. However, not only such a solution would increase the total cost of the memory sub-system, but also the charge that is held by the capacitor may not be always sufficient to perform all operations that may be necessary for a graceful shutdown.

Embodiments of the present disclosure address the above-noted and other deficiencies by implementing a memory sub-system that employs snapshot, journaling, and spare management unit markings in order to perform full metadata restoration by a recovery procedure following an unexpected power loss.

Thus, in anticipation of a possible power loss event, the memory sub-system controller can repeatedly save snapshots of the L2P table (e.g., upon the SMU write count reaching a threshold value), such that the latest snapshot before the power loss event would be used for power loss recovery. Each saved snapshot may be accompanied by a physical-to-logical (P2L) table and a list of spare (unallocated) management units, which may be utilized during the recovery process in order to reconstruct the L2P table updates that might have occurred between saving of the most recent L2P table snapshot and the time of the power loss event. Furthermore, the memory sub-system controller can further maintain a journal of post-snapshot L2P updates, which may be replayed by the recovery procedure, thus reducing the number of spare management units than needs to be examined. Accordingly, the power loss recovery may involve restoring the latest L2P table snapshot followed by replaying the journaled L2P updates and traversing the list of spare management units, thus fully restoring the L2P metadata to a consistent state consistent state that is synchronized with the state of the data stored by the memory sub-system, as described in more detail herein below.

Therefore, advantages of the systems and methods implemented in accordance with some embodiments of the present disclosure include, but are not limited to, reducing the cost of the memory device while enabling full metadata restoration after an unexpected power loss. While the examples described herein describe and/or reference 3D cross-point memory devices, memory devices of other memory device technologies can be employed by memory sub-systems operating in accordance with aspects of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as media management operations (including wear leveling operations and garbage collection operations), error detection and error-correcting code (ECC) operations, encryption operations, caching operations, and address translations between a logical address (e.g., a logical address, namespace) and a physical address (e.g., physical MU address, physical block address) that are associated with the memory devices 130.

Each physical management unit (e.g., block) can be programmed and erased reliably up to a certain number of times. For write-intensive applications, the memory sub-system controller 115 can implement a wear leveling algorithm to monitor and spread the number of write cycles per block. The wear leveling algorithm ensures that equal use is made of all the available write cycles for each block.

The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a metadata recovery manager component 113 that can be used to implement the metadata recovery strategies described herein. In some embodiments, the memory sub-system controller 115 includes at least a portion of the metadata recovery manager component 113. In some embodiments, the metadata recovery manager component 113 is part of the host system 110, an application, or an operating system. In other embodiments, local media controller 135 includes at least a portion of metadata recovery manager component 113 and is configured to perform the functionality described herein.

Figure 2:
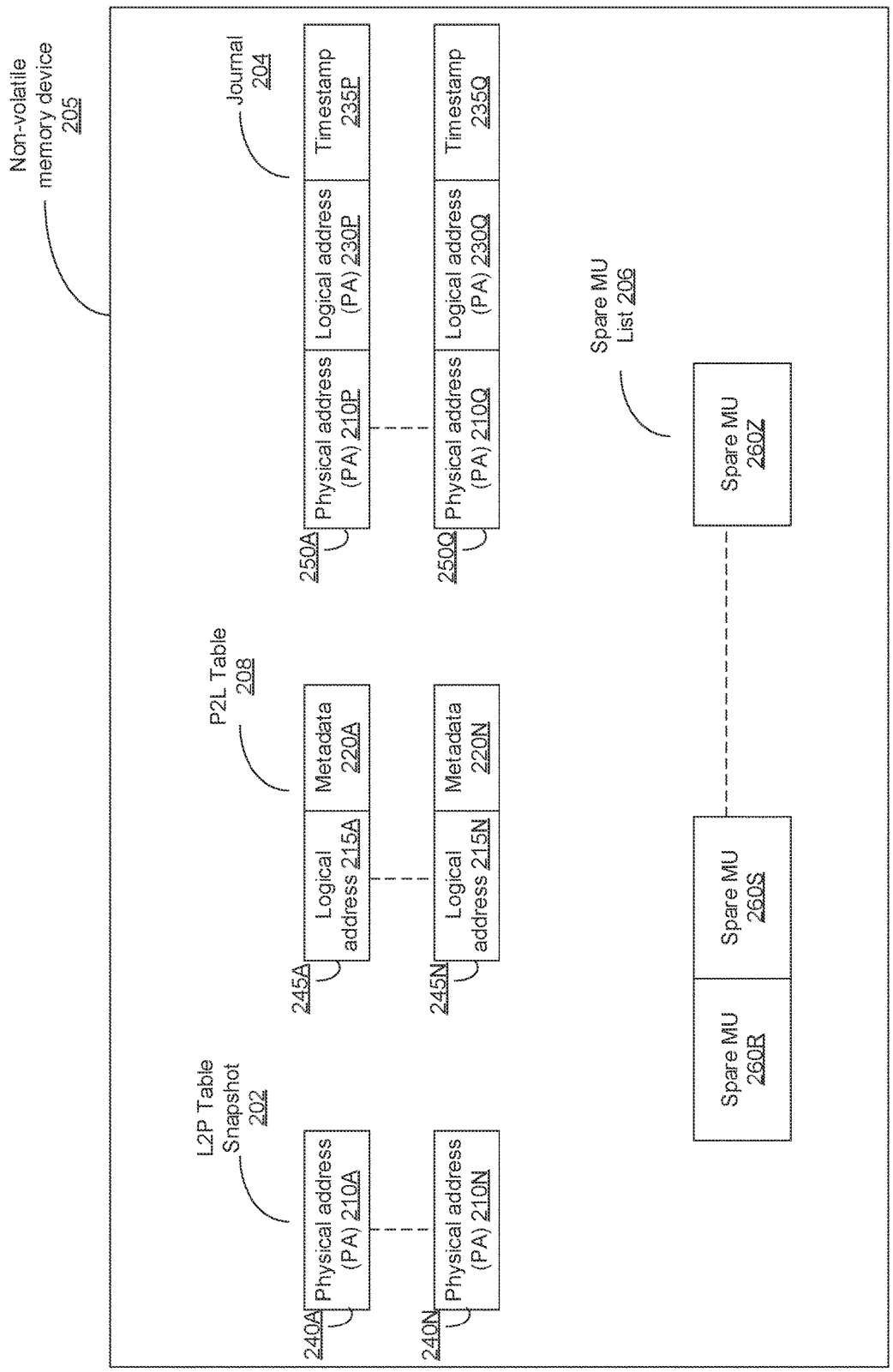
FIG. 2 schematically illustrates the data structures maintained by the metadata recovery manager component operating in accordance with aspects of the present disclosure.

FIG. 2 schematically illustrates the data structures maintained by the metadata recovery manager component 113 operating in accordance with aspects of the present disclosure. As noted herein above and schematically illustrated by FIG. 2, the metadata recovery manager component 113 can repeatedly store, to one or more non-volatile memory devices 205, L2P table snapshots 202, such that the L2P table snapshot 202 is accompanied by the P2L table 208, a list 206 of spare management units, and an L2P update journal 204 which reflects L2P metadata updates that have been performed after the most recent snapshot 202 was saved.

In some implementations, a new snapshot 202 may be saved responsive to evaluating a function of SMU write counts, all media write traffic including wear leveling writes, and write and read refresh operations. In an illustrative example, the function may be represented by a weighted sum of numbers of bytes for each of the above-referenced write operation types. Responsive to determining that the value of the function exceeds a predefined threshold value, the metadata recovery manager component 113 may save a new L2P table snapshot 202. The snapshot 202 may include a set of L2P table entries 240A-240N that are indexed by the logical address value, such that i-th entry 240 of the L2P table snapshot 202 stores the physical address (PA) 210 corresponding to Logical Address=i. The most recent snapshot 202 can be utilized as the starting point for the L2P metadata recovery, which may be performed when the memory sub-system is powered up after an unexpected power loss event.

The metadata recovery manager component 113 can further maintain a P2L table 208, which includes a set of P2L table entries 245A-245N that are indexed by the physical address value, such that j-th entry 245 of the P2L table 208 stores the logical address 215 corresponding to Physical Address j, and further stores one or more metadata values 220 (such as wear count, read count, etc.). In some implementations, the structure of the P2L table 208 can match the metadata structure 310 of FIG. 3, as described in more detail herein below. Furthermore, while in the example implementation illustrated by FIG. 2, the metadata fields 220 are shown as being part of the P2L table, in other implementations, the metadata fields may be stored in the corresponding L2P table records.

Upon saving the snapshot 202, the metadata recovery manager component 113 can further store a list of spare management units 206, each entry of which stores an identifier 260 (e.g., a physical address) of a spare (unallocated) management unit. The list 206 may be sorted in the ascending order of the metadata values (e.g., wear metric values), such that less worn management units would be retrieved from the list and utilized before more worn management units. The list 206 may be utilized during the recovery process thus facilitating reconstruction of the L2P table updates that have occurred between saving of the most recent L2P table snapshot and the time of the power loss event.

The metadata recovery manager component 113 can further maintain a journal 204 of post-snapshot L2P updates. The L2P update journal 204 can include a set of chronologically ordered entries 250A-250Q, such that each entry 250 stores a mapping of the physical address (PA) 210 corresponding to the logical address 230, and the timestamp 235. The L2P update journal 204 can be maintained in a volatile memory (e.g., DRAM), and may be stored to a non-volatile memory device upon exceeding a certain size (e.g., upon approaching the management unit size).

Accordingly, reconstructing the L2P table during the power loss recovery may involve restoring the L2P table using the most recent L2P table snapshot (e.g., by appending the most recent L2P table snapshot to an empty L2P table), followed by sequentially replaying the journaled L2P updates in the chronological order. Replaying an L2P journal entry 250 involves identifying the L2P table entry referenced by the logical address 230 of the L2P journal entry and setting the physical address field of the identified L2P journal entry to the value specified by the physical address field 210 of the L2P journal entry.

However, the L2P update journal 204 may not correctly reflect the most recent L2P update operation, if such an operation was interrupted by an unexpected power loss event. In order to determine that the physical management unit and the corresponding L2P metadata have been synchronized before the power loss event, the metadata recovery manager component 113 can read the last logical address of the physical management unit and ensure that the modification timestamp is less than the timestamp of the latest journal entry.

Accordingly, upon replaying the L2P update journal 204, the metadata recovery manager component 113 can further traverse the list 206 of spare management units. For each management unit referenced by the list 206, the storage media location (physical management unit) identified by the physical address specified by the list 206 may be examined.

Figure 3:
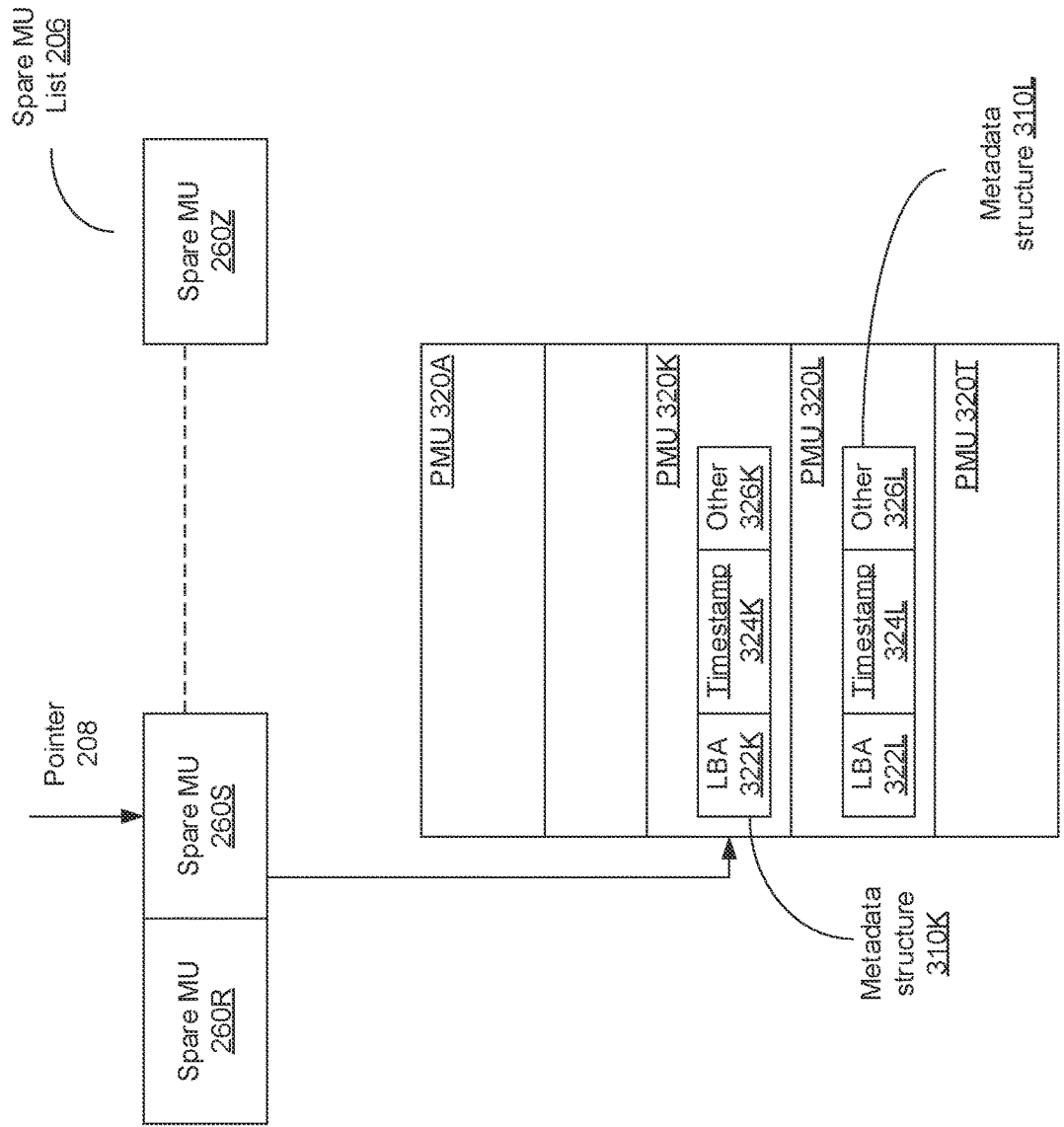
FIG. 3 schematically illustrates maintaining management unit metadata structures by the metadata recovery manager component operating in accordance with aspects of the present disclosure.

Upon initialization of the memory device, a management unit metadata structure 310 may be stored on each physical management unit (PMU) 320, as schematically illustrated by FIG. 3. When the physical management unit 320 is associated with a logical address, the metadata structure can be modified to store the logical address 322K and the modification timestamp 324K. Unallocated physical management units 320 can store a reserved value (e.g., 0xFFFFFFFF) in the logical address field 322K of their respective metadata structures 310. In some implementations, each metadata structure 310 can store various other fields 326, such as cyclic redundancy control (CRC) value, etc.

Accordingly, the list 206 of spare management units is traversed, starting from the head element 260R, by the metadata recovery manager component 113 updating the current element pointer 208. At each iteration, the physical management unit 320K referenced by the current value of the pointer 208 is identified and its metadata structure 310K is examined. Responsive to determining that the logical address field 322K of the metadata structure 310K stores a valid logical address rather than the reserved value that would indicate the unallocated state of the physical management unit 320K, the metadata recovery manager component 113 updates the L2P table entry identified by the logical address filed 322K referenced by the metadata structure 310K to store the physical address of the physical management unit 320K.

Responsive to determining that at least a predefined number of entries of the list 206 of spare management units have been examined, the list traversal process can be terminated. Upon completing the traversal of the spare management unit list 206, the L2P metadata is fully restored to a consistent state consistent state that is synchronized with the state of the data stored by the memory sub-system.

However, the above-described may not guarantee the correct L2P metadata restoration after certain patterns of cyclic L2P updates (e.g., media management block swap operations), which may result in the same spare management unit markings as were observed before the cyclic update. In an illustrative example, the following sequence of wear leveling block swap operations would not be correctly reconstructed based just on the spare management unit markings:

1. Disassociating the logical address L0 from physical address PA and associating with physical address PB (i.e., the physical management unit identified by the physical address PB replaces, for host data storage, the physical management unit identified by the physical address PA);
2. Disassociating the logical address L1 from physical address PC and associating with physical address PA (i.e., the physical management unit identified by the physical address PA replaces, for host data storage, the physical management unit identified by the physical address PC); and
3. Disassociating the logical address L0 from physical address PB and associating with physical address PC (i.e., the physical management unit identified by the physical address PC replaces, for host data storage, the physical management unit identified by the physical address PB).

This result of this sequence of operations is equivalent to swapping the data referenced by logical addresses L0 and L1 (physical addresses PA and PC, respectively) without any involvement of the physical management unit referenced by the physical address PB, which would have spare markings before and after performing the sequence of operations. Accordingly, if the three updates are performed just before the power loss, the metadata recovery manager component 113 would not be able to correctly reconstruct the L2P metadata.

Accordingly, in some implementations, the metadata recovery manager component 113 can enforce a blackout window before a replaced physical management units can be reused, thus excluding the cyclic update patterns that are similar to the above-described sequence of operations. Thus, the metadata recovery manager component 113 can put a replaced physical management unit into a blackout queue (e.g., a first-in-first-out (FIFO) data structure), such that the physical management unit would not be reused before it gets out of the queue. Employing the blackout queue would thus introduce a delay before a recently swap-out block is appended to the spare list. The size of the blackout queue may be at least the maximum number of data move records in the L2P journal.

Figure 4A:
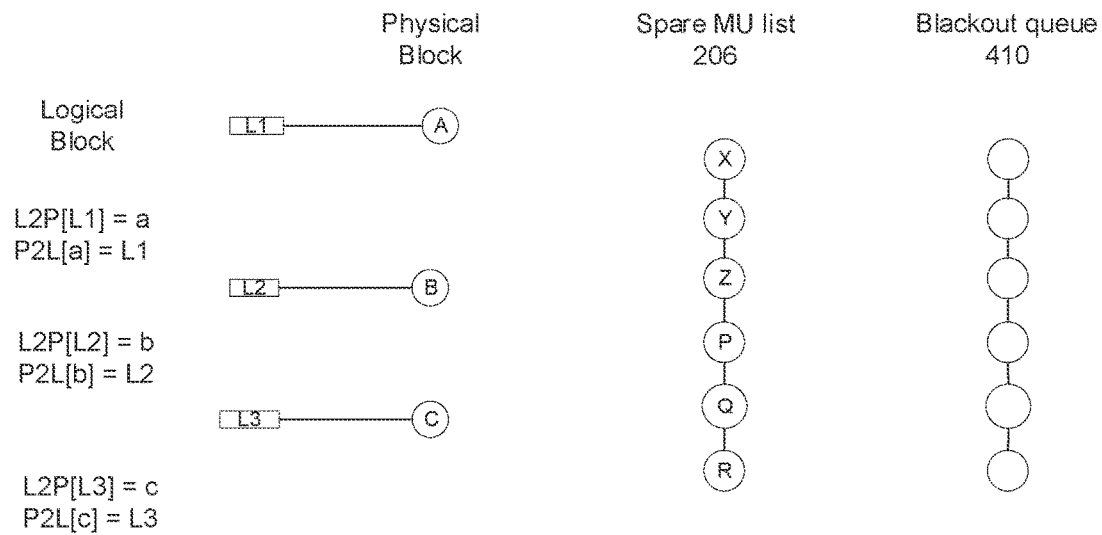
FIGS. 4A-4E schematically illustrate examples of metadata structures maintained by the metadata recovery manager component operating in accordance with aspects of the present disclosure.
Figure 4B:
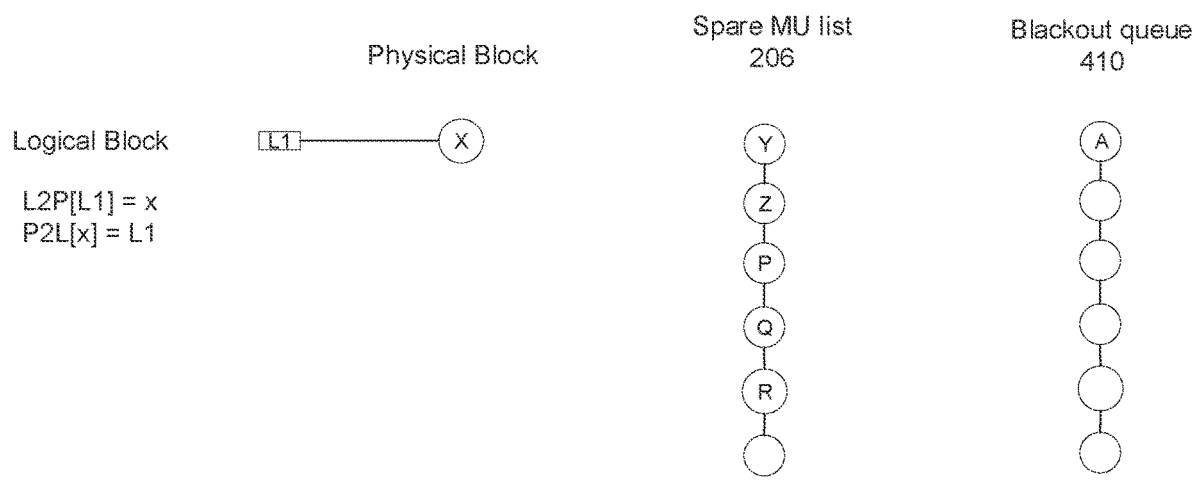
Figure 4C:
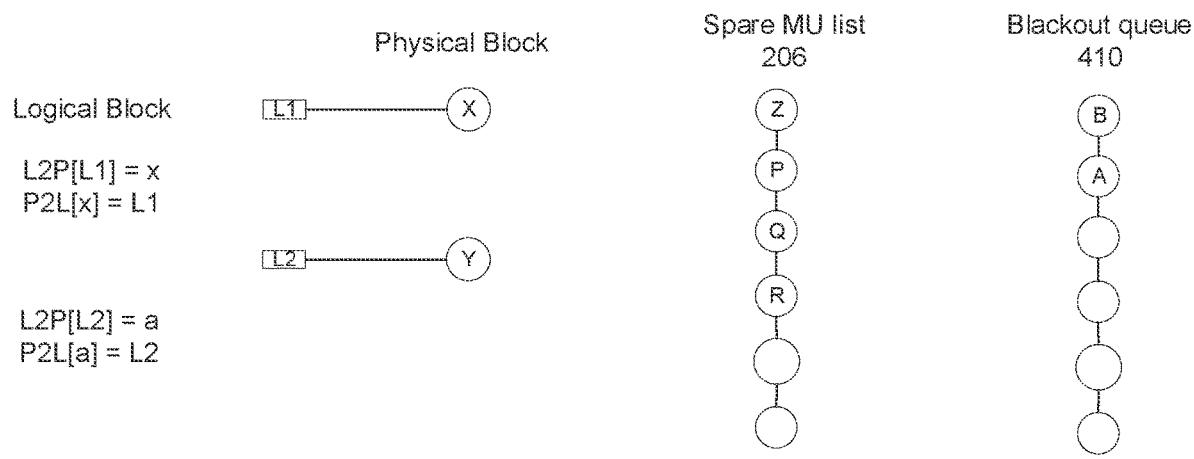
Figure 4D:
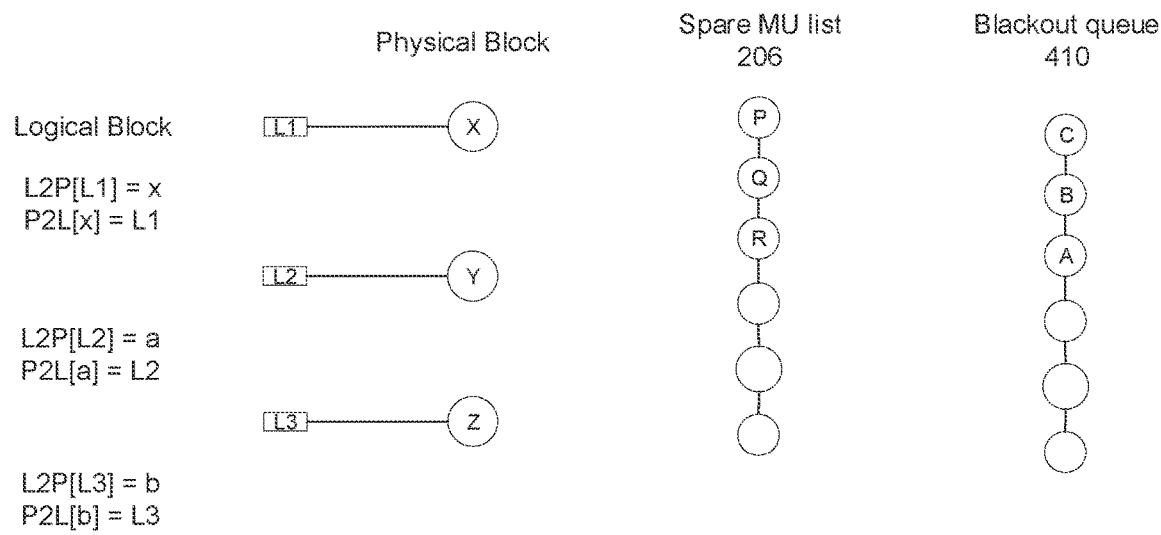
Figure 4E:
Figure 4E:
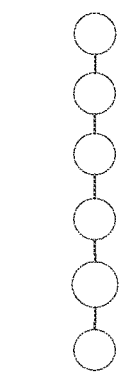
Figure 4E:
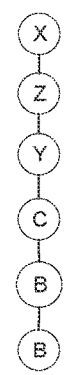
Figure 4E:
Figure 4E:

FIGS. 4A-4E schematically illustrate employing the blackout queue for tracking spare management units, in accordance with aspects of the present disclosure. In particular, FIG. 4A schematically illustrates an example initial state of several physical management units and their mappings, as well as the spare list and the blackout queue. As shown in FIG. 4A, logical address L1 is mapped to the physical management unit A, logical address L2 is mapped to the physical management unit B, and logical address L3 is mapped to the physical management unit C. In FIG. 4B, logical address L1 is re-mapped to the physical management unit X (which is retrieved from the top of the spare list), and the identifier of the physical management unit A is added to the blackout queue. In FIG. 4C, logical address L2 is re-mapped to the physical management unit Y (which is retrieved from the top of the spare list), and the identifier of the physical management unit B is added to the blackout queue. In FIG. 4D, logical address L3 is re-mapped to the physical management unit Z (which is retrieved from the top of the spare list), and the identifier of the physical management unit C is added to the blackout queue. In FIG. 4E, logical address L2 is re-mapped to the physical management unit P (which is retrieved from the top of the spare list), and the identifier of the physical management unit Y is added to the blackout queue; logical address L3 is re-mapped to the physical management unit Q (which is retrieved from the top of the spare list), and the identifier of the physical management unit Z is added to the blackout queue; and logical address L1 is re-mapped to the physical management unit R (which is retrieved from the top of the spare list), and the identifier of the physical management unit X is added to the blackout queue.

Accordingly, when an L2P snapshot is flushed (e.g., after a graceful shutdown or during runtime), the metadata recovery manager component 113 can merge the blackout queue into the list 206 of spare management units and then flush the list 206 as part of flushing the L2P snapshot. Conversely, responsive to detecting a power up event following a power loss event (e.g., after an ungraceful shutdown), the blackout queue, that was not saved to a non-volatile memory device before the ungraceful shutdown, can be reconstructed during replaying L2P journal entries and the traversal of the list of spare management units, such that the reconstructed queue entries would also be replayed as part of the metadata reconstruction process.

Figure 5:
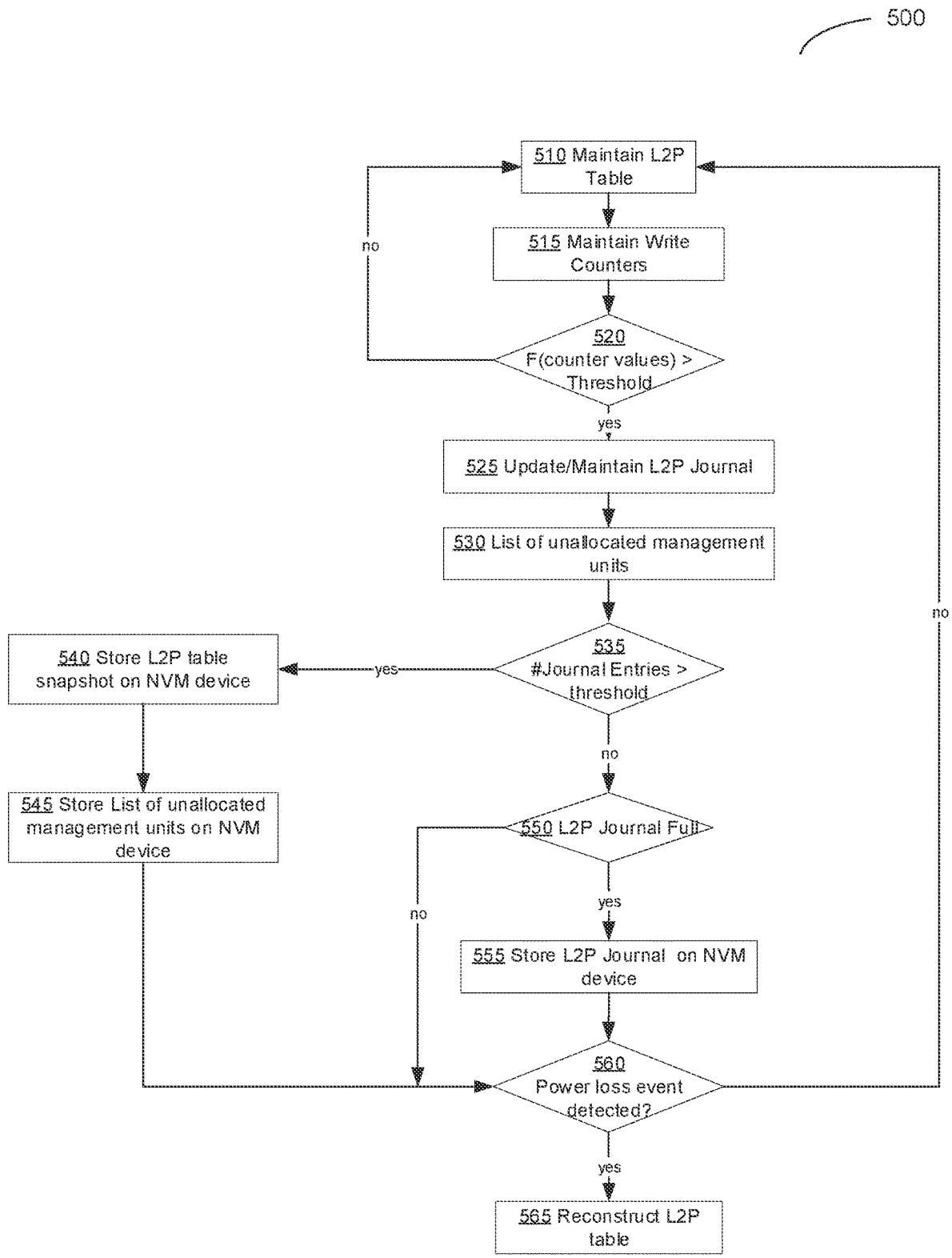
FIG. 5 is a flow diagram of an example method 500 of maintaining L2P metadata on a non-volatile memory device and reconstructing L2P metadata after a power loss event by a memory sub-system controller operating in accordance with embodiments of the present disclosure.

FIG. 5 is a flow diagram of an example method 500 of maintaining L2P metadata on a non-volatile memory device and reconstructing L2P metadata after a power loss event by a memory sub-system controller operating in accordance with embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the power loss recovery manager component 115 of FIG. 1.

Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing device of the memory sub-system controller maintains a logical-to-physical (L2P) table, one or more regions of which are cached in a volatile memory, as described in more detail herein above.

At operation 515, the processing device maintains one or more write counters, including, e.g., a write count reflecting a number of bytes written to the memory device, as described in more detail herein above.

Responsive to determining, at operation 520, that a value of a predetermined function of the write counters exceeds a threshold value, the processing device, at operation 525, maintains an L2P journal, such that each L2P journal entry reflects a metadata update operation with respect to the L2P table, as described in more detail herein above.

At operation 530, the processing device maintains a list of spare (unallocated) management units, each entry of which stores an identifier (e.g., a physical address) of a spare (unallocated) management unit accompanied by optional metadata (e.g., a wear metric of the unallocated management unit), as described in more detail herein above.

Responsive to determining, at operation 535, that the number of L2P journal entries in the L2P journal exceeds a predefined threshold number, the processing device, at operation 540, stores the L2P table on a non-volatile memory device. At operation 545, the processing device stores the list of unallocated management units on the non-volatile memory device, and the processing continues at operation 560.

Conversely, responsive to determining, at operation 535, that the number of L2P journal entries in the L2P journal does not exceed the predefined threshold number, the processing continues at operation 550.

Responsive to determining, at operation 550, that the L2P journal is full (e.g., the size of the L2P journal exceeds a predefined threshold size) the processing device, at operation 555, stores the L2P table on a non-volatile memory device.

Responsive to detecting, at operation 560, a power up event following a power loss event, the processing device, at operation 565, reconstructs the L2P table. Reconstructing the L2P table involves restoring the L2P table using the most recent L2P table snapshot, sequentially replaying the journaled L2P updates in the chronological order, and traversing the list of the unallocated (spare) management units.

Replaying an L2P journal entry involves identifying the L2P table entry referenced by the logical address of the L2P journal entry and setting the physical address field of the identified L2P journal entry to the value specified by the physical address field of the L2P journal entry. In some implementations, the metadata field of the identified L2P table entry may be also set to the value specified by the metadata field of the L2P journal entry.

Upon replaying all L2P journal entries, the list of spare management units is traversed, starting from the head element. At each iteration, the physical management unit referenced by the current value of the list pointer is identified and its metadata structure is examined. Responsive to determining that the logical address field of the metadata structure stores a valid logical address, the metadata recovery manager component updates the L2P table entry identified by the logical address filed referenced by the metadata structure to store the physical address of the physical management unit.

Responsive to determining that at least a predefined number of entries of the list of spare management units have been examined, the list traversal process can be terminated. Upon completing the traversal of the spare management unit list, the L2P metadata is fully restored to a consistent state consistent state that is synchronized with the state of the data stored by the memory sub-system.

Figure 6:
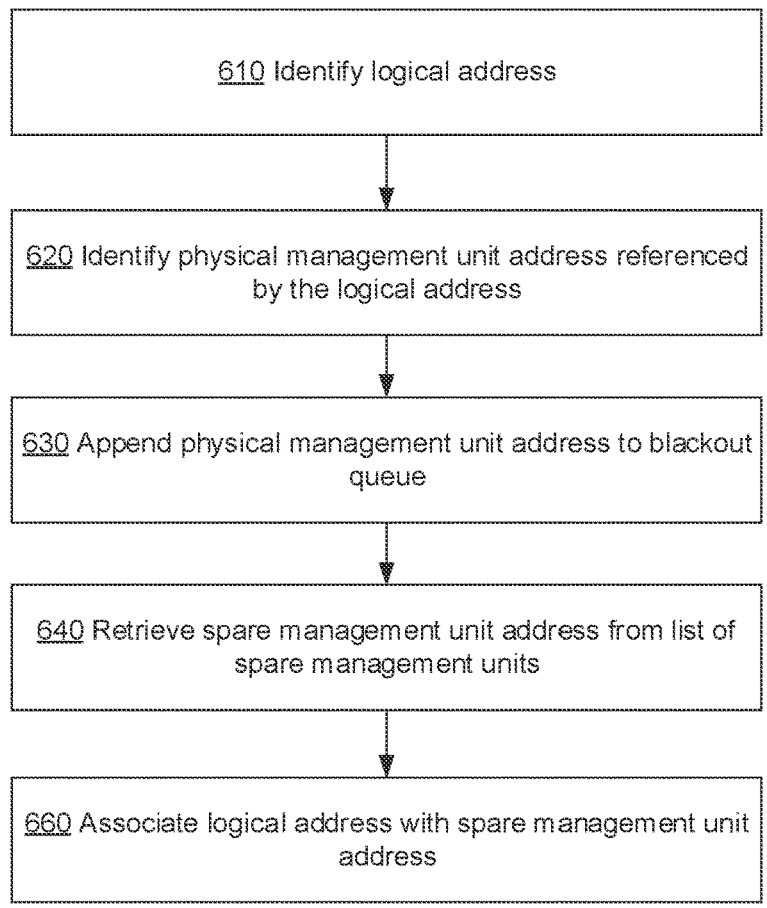
FIG. 6 is a flow diagram of an example method 600 of performing a media management operation by a memory sub-system controller operating in accordance with embodiments of the present disclosure.

FIG. 6 is a flow diagram of an example method 600 of performing a media management operation by a memory sub-system controller operating in accordance with embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the power loss recovery manager component 116 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 610, the processing device identifies logical address (e.g., for performing a media management operation, such as a wear leveling operation.

At operation 620, the processing device identifies the physical management unit address referenced by the logical address.

At operation 630, the processing device appends the physical management unit address to a blackout queue.

At operation 640, the processing device retrieves a spare (unallocated) physical management unit address from a list of spare (unallocated) management units.

At operation 650, the processing device associates the identified logical address with the retrieved physical management unit address.

Figure 7:
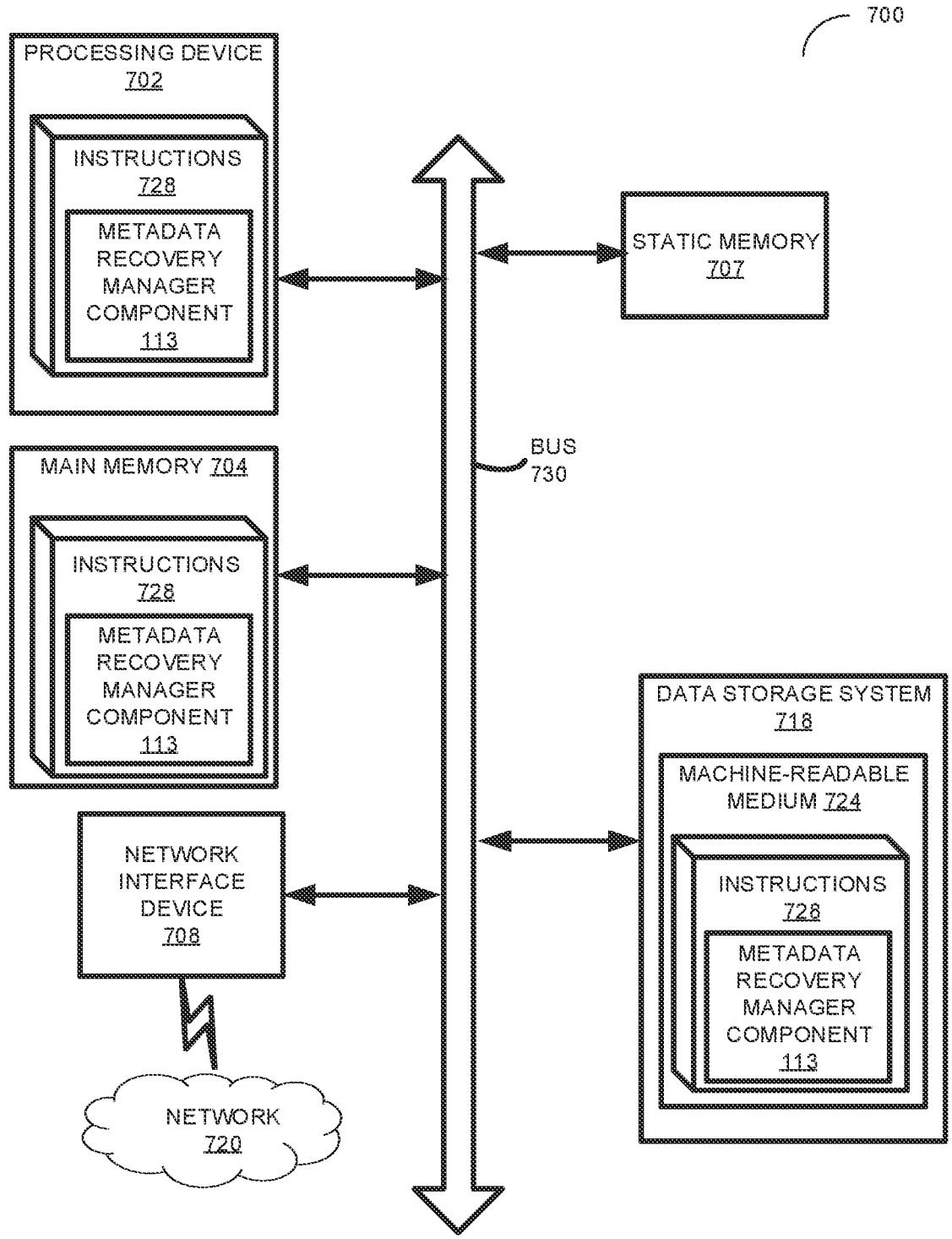
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 17 of FIG. 1) or can be used to perform the operations of a controller (e.g., to execute an operating system to perform operations corresponding to the metadata recovery manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 707 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 728 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 728 or software embodying any one or more of the methodologies or functions described herein. The instructions 728 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 17 of FIG. 1.

In one embodiment, the instructions 728 include instructions to implement functionality corresponding to the metadata recovery manager component 113 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
one or more memory devices; and
a processing device, operatively coupled to the one or more memory devices, the processing device to:
store, on a non-volatile memory device of the one or more memory devices, a snapshot of a logical-to-physical (L2P) table comprising a plurality of L2P table entries, each L2P table entry mapping a logical address defined in a logical address space to a physical address identifying a management unit on a memory device of the one or more memory devices;
store, on the non-volatile memory device of the one or more memory devices, a physical-to-logical (P2L) table comprising a plurality of P2L table entries, each P2L table entry mapping a physical address identifying a management unit on a memory device of the one or more memory devices to metadata associated with the management unit;
store, on the non-volatile memory device, a list of unallocated MUs;
store, on the non-volatile memory device, an L2P update journal including one or more L2P journal entries, wherein each L2P journal entry reflects an update to an L2P table entry of the plurality of L2P table entries, wherein the update has been performed after storing the snapshot of the L2P table; and
responsive to detecting a power up event following a power loss event, reconstruct the L2P table using the snapshot of the L2P table, the L2P update journal, the P2L table, and the list of unallocated management units.

2. The system of claim 1, wherein the list of unallocated management units is ordered by wear metric values associated with respective management units.

3. The system of claim 1, wherein the L2P update journal is chronologically ordered by timestamps of the L2P journal entries.

4. The system of claim 1, wherein reconstructing the L2P table further comprises:
restoring the L2P table by appending the snapshot of the L2P table to an empty L2P table;
updating the L2P table by sequentially replaying each L2P journal entry of the L2P update journal; and
updating the L2P table by traversing the list of unallocated management units.

5. The system of claim 4, wherein replaying an L2P journal entry further comprises:
identifying an L2P table entry referenced by a logical address of the L2P journal entry; and
setting a physical address field of the identified L2P journal entry to a value specified by a physical address field of the L2P journal entry.

6. The system of claim 4, wherein traversing the list of unallocated management units further comprises:
identifying a physical management unit referenced by a pointer associated with the list of unallocated management units;
responsive to determining that a logical address field of a metadata structure of the physical management unit stores a valid logical address, updating an L2P table entry identified by the logical address field to store a physical address of the physical management unit.

7. The system of claim 1, wherein the processing device is further to:
maintain a queue of replaced management units, each element of the queue stores an identifier of a physical management unit that has been unallocated by a write operation.

8. The system of claim 7, wherein a size of the queue exceeds a maximum size of the L2P update journal.

9. A method comprising:
storing, by a controller managing one or more memory devices, on a non-volatile memory device of the one or more memory devices, a snapshot of a logical-to-physical (L2P) table comprising a plurality of L2P table entries, each L2P table entry mapping a logical address defined in a logical address space to a physical address identifying a management unit on a memory device of the one or more memory devices;
storing, on the non-volatile memory device of the one or more memory devices, a physical-to-logical (P2L) table comprising a plurality of P2L table entries, each P2L table entry mapping a physical address identifying a management unit on a memory device of the one or more memory devices to metadata associated with the management unit;
storing, on the non-volatile memory device, a list of unallocated MUs;
storing, on the non-volatile memory device, an L2P update journal including one or more L2P journal entries, wherein each L2P journal entry reflects an update to an L2P table entry of the plurality of L2P table entries, wherein the update has been performed after storing the snapshot of the L2P table; and
responsive to detecting a power up event following a power loss event, reconstructing the L2P table using the snapshot of the L2P table, the L2P update journal, the P2L table, and the list of unallocated management units.

10. The method of claim 9, wherein the list of unallocated management units is ordered by wear metric values associated with respective management units.

11. The method of claim 9, wherein the L2P update journal is chronologically ordered by timestamps of the L2P journal entries.

12. The method of claim 9, wherein reconstructing the L2P table further comprises:
restoring the L2P table by appending the snapshot of the L2P table to an empty L2P table;
updating the L2P table by sequentially replaying each L2P journal entry of the L2P update journal; and
updating the L2P table by traversing the list of unallocated management units.

13. The method of claim 12, wherein replaying an L2P journal entry further comprises:
identifying an L2P table entry referenced by a logical address of the L2P journal entry; and
setting a physical address field of the identified L2P journal entry to a value specified by a physical address field of the L2P journal entry.

14. The method of claim 12, wherein traversing the list of unallocated management units further comprises:
identifying a physical management unit referenced by a pointer associated with the list of unallocated management units;
responsive to determining that a logical address field of a metadata structure of the physical management unit stores a valid logical address, updating an L2P table entry identified by the logical address field to store a physical address of the physical management unit.

15. The method of claim 9, further comprising:
maintaining a queue of replaced management units, each element of the queue stores an identifier of a physical management unit that has been unallocated by a write operation.

16. A computer-readable non-transitory storage medium comprising executable instructions that, when executed by a processing device of a controller managing one or more memory devices, cause the processing device to:
store, on a non-volatile memory device of the one or more memory devices, a snapshot of a logical-to-physical (L2P) table comprising a plurality of L2P table entries, each L2P table entry mapping a logical address defined in a logical address space to a physical address identifying a management unit on a memory device of the one or more memory devices;
store, on the non-volatile memory device of the one or more memory devices, a physical-to-logical (P2L) table comprising a plurality of P2L table entries, each P2L table entry mapping a physical address identifying a management unit on a memory device of the one or more memory devices to metadata associated with the management unit;
store, on the non-volatile memory device, a list of unallocated MUs;
store, on the non-volatile memory device, an L2P update journal including one or more L2P journal entries, wherein each L2P journal entry reflects an update to an L2P table entry of the plurality of L2P table entries, wherein the update has been performed after storing the snapshot of the L2P table; and
responsive to detecting a power up event following a power loss event, reconstruct the L2P table using the snapshot of the L2P table, the L2P update journal, the P2L table, and the list of unallocated management units.

17. The computer-readable non-transitory storage medium of claim 16, wherein reconstructing the L2P table further comprises:
restoring the L2P table by appending the snapshot of the L2P table to an empty L2P table;
updating the L2P table by sequentially replaying each L2P journal entry of the L2P update journal; and
updating the L2P table by traversing the list of unallocated management units.

18. The computer-readable non-transitory storage medium of claim 17, wherein replaying an L2P journal entry further comprises:
identifying an L2P table entry referenced by a logical address of the L2P journal entry; and
setting a physical address field of the identified L2P journal entry to a value specified by a physical address field of the L2P journal entry.

19. The computer-readable non-transitory storage medium of claim 17, wherein traversing the list of unallocated management units further comprises:
identifying a physical management unit referenced by a pointer associated with the list of unallocated management units;
responsive to determining that a logical address field of a metadata structure of the physical management unit stores a valid logical address, updating an L2P table entry identified by the logical address field to store a physical address of the physical management unit.

20. The computer-readable non-transitory storage medium of claim 16, further comprising executable instructions that, when executed by the processing device, cause the processing device to:
maintain a queue of replaced management units, each element of the queue stores an identifier of a physical management unit that has been unallocated by a write operation.

* * * * *